(12) United States Patent
Jonas

(10) Patent No.: US 10,161,493 B2
(45) Date of Patent: Dec. 25, 2018

(54) AXLE ASSEMBLY WITH RETAINING MEMBER FOR SECURING DIFFERENTIAL BEARING ADJUSTERS TO AXLE HOUSING

(71) Applicant: AMERICAN AXLE & MANUFACTURING, INC., Detroit, MI (US)

(72) Inventor: Eduardo Jonas, Detroit, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 263 days.

(21) Appl. No.: 15/036,182

(22) PCT Filed: Nov. 12, 2014

(86) PCT No.: PCT/US2014/065129
§ 371 (c)(1),
(2) Date: May 12, 2016

(87) PCT Pub. No.: WO2015/073485
PCT Pub. Date: May 21, 2015

(65) Prior Publication Data
US 2016/0298745 A1    Oct. 13, 2016

Related U.S. Application Data

(60) Provisional application No. 61/904,079, filed on Nov. 14, 2013.

(51) Int. Cl.
*F16H 48/40* (2012.01)
*F16H 48/08* (2006.01)
(Continued)

(52) U.S. Cl.
CPC ........... *F16H 48/40* (2013.01); *B60K 17/165* (2013.01); *B60K 17/344* (2013.01);
(Continued)

(58) Field of Classification Search
None
See application file for complete search history.

(56) References Cited

U.S. PATENT DOCUMENTS 2,548,258 A * 4/1951 Griffith ................. B60K 17/16
475/245
3,001,842 A 9/1961 Boyd
(Continued)

FOREIGN PATENT DOCUMENTS

JP    2007162869 A    6/2007

OTHER PUBLICATIONS

International Search Report and Written Opinion for PCT/US2014/065129, dated Feb. 23, 2015; ISA/KR.

*Primary Examiner* — Colby M Hansen
(74) *Attorney, Agent, or Firm* — Harness, Dickey & Pierce, P.L.C.

(57) ABSTRACT

A power transmitting component that includes a housing, a case, a bearing, a bearing adjuster, and a retaining member. The housing defines a bearing bulkhead and an aperture, the aperture being disposed about a first axis. A pinion is coupled to the housing for rotation about a second axis that is not coincident with the first axis. A ring gear is coupled to the differential case and is meshed with the pinion. A bearing supports the case for rotation relative to the housing about the first axis. A bearing adjuster is disposed within the aperture and abuts the bearing. The retaining member is formed of a polymeric material and couples the bearing adjuster to the bearing bulkhead such that the bearing adjuster is non-rotatably and axially fixed to the housing and a preload is applied to the bearing in a direction along the first axis.

20 Claims, 3 Drawing Sheets

(51) Int. Cl.
*F16H 57/12* (2006.01)
*F16H 57/037* (2012.01)
*B60K 17/16* (2006.01)
*B60K 17/344* (2006.01)
*B60K 17/348* (2006.01)
*F16H 57/023* (2012.01)
*F16H 23/08* (2006.01)
*B60K 23/08* (2006.01)

(52) U.S. Cl.
CPC ........... *B60K 17/348* (2013.01); *F16H 48/08* (2013.01); *F16H 57/023* (2013.01); *F16H 57/037* (2013.01); *F16H 57/12* (2013.01); *B60K 23/08* (2013.01); *B60K 2023/0825* (2013.01); *F16H 2048/405* (2013.01); *F16H 2057/125* (2013.01)

(56) References Cited

U.S. PATENT DOCUMENTS

| | | | | |
|---|---|---|---|---|
| 3,563,104 A | * | 2/1971 | Schuster | F16H 48/08 475/7 |
| 4,840,087 A | * | 6/1989 | Welschof | B60K 17/165 403/57 |
| 5,269,731 A | | 12/1993 | Scudder et al. | |
| 5,443,316 A | * | 8/1995 | Deane | B60B 27/001 384/485 |
| 5,971,123 A | * | 10/1999 | Ochab | F16D 27/10 192/38 |
| 6,318,201 B1 | * | 11/2001 | Yoshioka | F16H 48/08 384/563 |
| 6,378,677 B1 | * | 4/2002 | Kuroda | B60K 23/04 192/35 |
| 6,398,689 B1 | | 6/2002 | Morse et al. | |
| 7,485,065 B2 | | 2/2009 | Kearney | |
| 7,794,153 B2 | | 9/2010 | Szczepanski et al. | |
| 8,167,762 B2 | | 5/2012 | Zink et al. | |
| 8,460,149 B1 | * | 6/2013 | Chemelli | F16H 48/40 475/230 |
| 2006/0276298 A1 | | 12/2006 | Rodgers et al. | |
| 2009/0145683 A1 | | 6/2009 | Szczepanski et al. | |
| 2013/0303323 A1 | * | 11/2013 | Zink | F16H 57/037 475/160 |

* cited by examiner

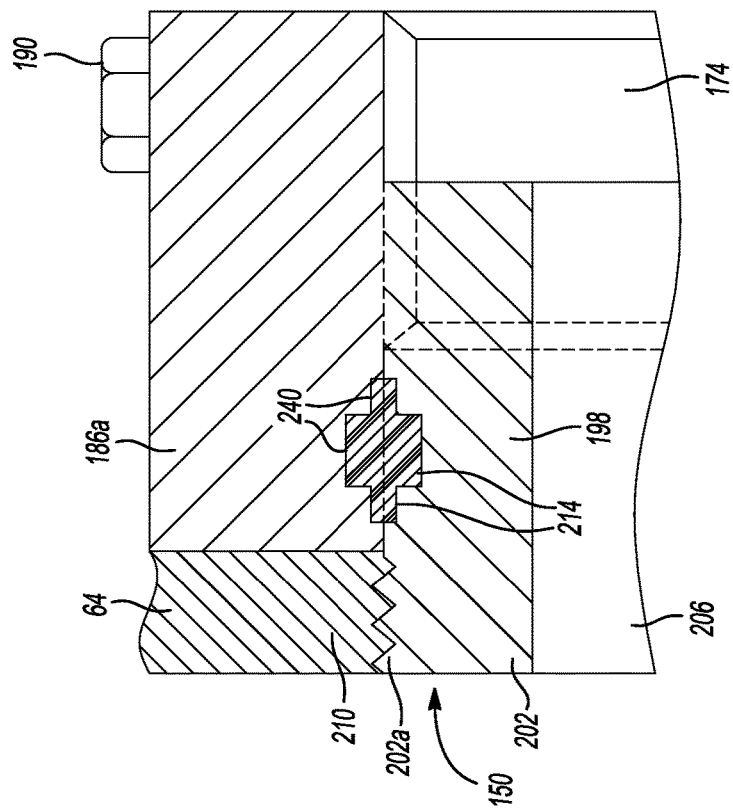
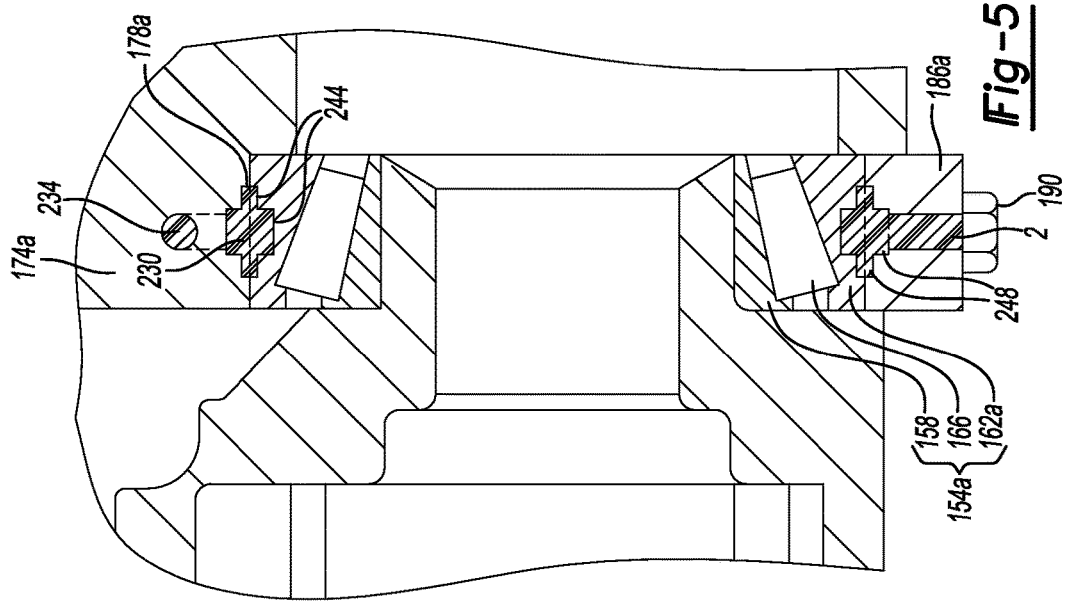

AXLE ASSEMBLY WITH RETAINING MEMBER FOR SECURING DIFFERENTIAL BEARING ADJUSTERS TO AXLE HOUSING

FIELD

The present disclosure relates to a power transmitting component with a differential bearing system.

BACKGROUND

This section provides background information related to the present disclosure which is not necessarily prior art.

Various power transmitting components, such as an automotive axle assembly, employ a differential assembly that permits speed differentiation between two output members. A conventional automotive axle assembly can include an axle housing, an input pinion that is mounted in the axle housing for rotation about a first axis, a differential that is mounted in the axle housing for rotation about a second axis and a ring gear that is mounted to the differential and meshingly engaged to the input pinion. Many of these axle assemblies further include a differential bearing system that can include a pair of differential bearings and a pair of threaded bearing adjusters. The differential bearings can support the differential for rotation on the axle housing, while the threaded bearing adjusters are configured to be rotated relative to another component to permit the differential bearings (and therefore the differential) to be positioned along the second axis and/or to apply a desired amount of preload to the differential bearings.

A locking system is typically employed to inhibit movement of the threaded bearing adjuster relative to another structure (e.g., the axle housing). Exemplary locking systems are disclosed in U.S. Pat. Nos. 3,001,842; 6,398,689; 7,485,065 and 7,794,153, as well as in U.S. Publication No. 2006/0276298. Such locking systems typically comprise a clip that engages the threaded bearing adjuster, and may include a fastener for retaining the clip to the axle housing. While such differential bearing systems are suited for their intended use, there nonetheless remains a need in the art for an improved differential bearing system.

SUMMARY

This section provides a general summary of the disclosure, and is not comprehensive disclosure of its full scope or all of its features.

In one form, the present teachings provide a power transmitting component that includes a housing, a differential case, a bearing, a bearing adjuster, a pinion, and a retaining member. The housing defines a bearing bulkhead and an aperture with the aperture being disposed about a first axis. The bearing supports the case for rotation relative to the housing. A pinion is coupled to the housing and rotates on an axis not coincident with the aperture. A ring gear is attached to the case and meshes with the pinion. The bearing adjuster is disposed within the aperture and abuts the bearing. The retaining member is made of a polymeric material and couples the bearing adjuster to the bearing bulkhead such that the bearing adjuster is non-rotatably and axially fixed to the housing thereby applying a preload to the bearing along the aperture axis.

In another form, the present teachings provide a power transmitting component that includes a housing, a differential case, a pair of bearings, a pair of bearing adjusters, and a pair of retaining members. The housing defines a pair of bearing bulkheads, each of the bulkheads having an aperture disposed about a first axis. The apertures have a plurality of first grooves disposed about them. The differential case is received between the bearing bulkheads and is supported for rotation relative to the housing along the first axis by the differential bearings. The bearing adjusters are received within an associated one of the apertures and have a plurality of second grooves on the bearing adjuster outer surfaces. The bearing adjusters each abut an associated one of the bearings. Each of the retaining members being received in the first and second grooves thereby axially and non-rotatably coupling the bearing adjusters to the housing and securing the bearings in a preloaded condition along the first axis.

In still another form, the present teachings provide a method of assembling an axle including inserting an input pinion and a differential case with an attached ring gear into an axle. The differential case is then inserted into a housing defined aperture having a differential bearing inside the aperture. The differential case is positioned so as to mesh the input pinion with the ring gear in a predetermined manner. A preload is applied to the differential bearing followed by the injection of a plastic material between the outer bearing race and the axle housing in order to form retaining members which axially and non-rotatably couple the outer bearing race of an associated one of the differential bearings to the axle housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a view similar to that of FIG. 3, but depicting a portion of an alternately constructed axle assembly; and FIG. 6 is an enlarged portion of FIG. 3 illustrating an embodiment of the interface between the axle housing, the bearing adjuster, and the bearing bulkhead.

Corresponding reference numerals indicate corresponding parts throughout the several views of the drawings.

DETAILED DESCRIPTION

Figure 1:
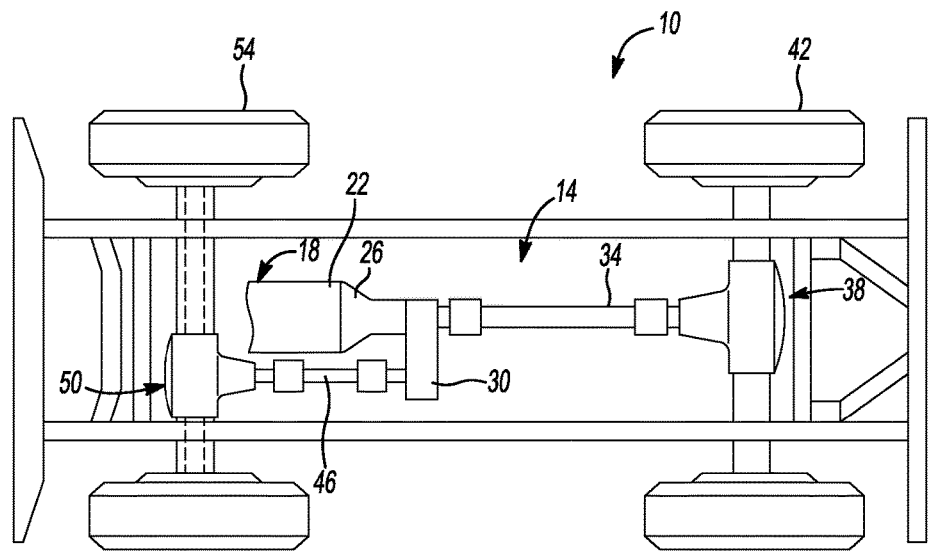
FIG. 1 is a schematic illustration of a vehicle having a power transmitting component (i.e., a rear axle assembly) constructed in accordance with the teachings of the present disclosure.

With reference to FIG. 1 of the drawings, a vehicle having a power transmitting component (e.g., rear axle assembly 38) constructed in accordance with the teachings of the present disclosure is generally indicated by reference numeral 10. The vehicle 10 can include a driveline 14 that is powered (i.e., driven) by a power train 18. The power train 18 can include an engine 22 and a transmission 26. The driveline 14 can include a transfer case 30 or other power distributing device, a rear propshaft 34, a rear axle assembly 38, a plurality of rear wheels 42, a front propshaft 46, a front axle assembly 50 and a pair of front wheels 54. The engine 22 can be mounted in an in-line or longitudinal orientation along the longitudinal axis of the vehicle 10 and its output can be coupled to the input of the transmission 26 in a conventional manner to transmit rotary power (i.e., drive torque) therebetween. The transmission 26 can include an output and a gear reduction unit that can be employed to couple the transmission input to the transmission output at a selected gear or speed ratio.

The transfer case 30 can be a conventional transfer case and can be coupled to the transmission 26 configured to transmit rotary power to the rear axle assembly 38 and the front axle assembly 50 in a desired manner. For example, the transfer case 30 can be operable in a first mode in which rotary power is transmitted only to the rear axle assembly 38 and in a second mode in which drive torque is allocated between the rear and front axle assemblies 38 and 50 in a predetermined manner.

The rear propshaft 34 is conventional and couples a rear output of the transfer case 30 to an input of the rear axle assembly 38. The rear wheels 42 are coupled to and driven by the rear axle assembly 38 in a conventional manner. The front propshaft 46 is conventional and couples a front output of the transfer case 30 to the front axle assembly 50, which can be constructed in a manner that is similar to the rear axle assembly 38. The front wheels 54 are coupled to and driven by the front axle assembly 50.

Figure 2:
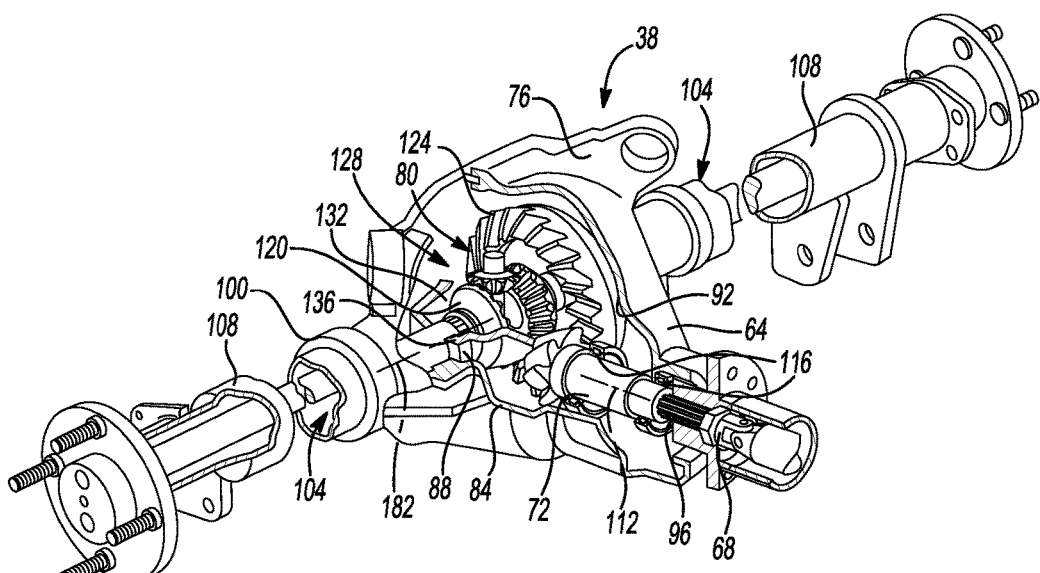
FIG. 2 is a perspective view of a portion of FIG. 1 illustrating the axle assembly in greater detail.

With reference to FIG. 2 the rear axle assembly 38 can include an axle housing 64, a pinion yolk 68, a pinion 72, a carrier housing 76, and a differential assembly 80. The carrier housing 76 can include a wall member 84 and a pair of bearing bulkhead structures 88. The wall member 84 can define a cavity 92 as well as a pinion bore 96, and a pair of collars 100 that can define respective axle tube bores 104. A pair of axle tubes 108 can be disposed within the axle tube bores 104. The bearing bulkhead structures 88 can be disposed in the cavity 92 and interconnected to the wall member 84. The pinion 72 can be placed in the pinion bore 96 which can be disposed about a first axis 112. The pinion 72 can be received in the pinion bore 96 and supported on pinion bearings 116 for rotation about the first axis 112.

The differential assembly 80 can include a differential case 120, a ring gear 124, and a means for dividing power between a pair of output members, such as a gear set 128. The differential case 120 can be received between the pair of bearing bulkheads 88 and can define a case cavity 132, into which the gear set 128 is received, and a pair of bearing hubs 136 (only one shown). The ring gear 124 can be coupled to the differential case 120 by any suitable means, such as laser welding or via a plurality of threaded fasteners (not shown). The bearing hubs 136 can be generally tubular projections formed onto the opposite sides of the differential case 120.

Each axle tube 108 can be a hollow, tubular structure that can be received into a respective one of the collars 100. If desired, the axle tubes 108 can engage the collars 100 in a press-fit or interference-fit manner. Slug welds (not shown) can be employed to inhibit axial and rotational movement of the axle tubes 108 relative to the carrier housing 76.

Figure 3:
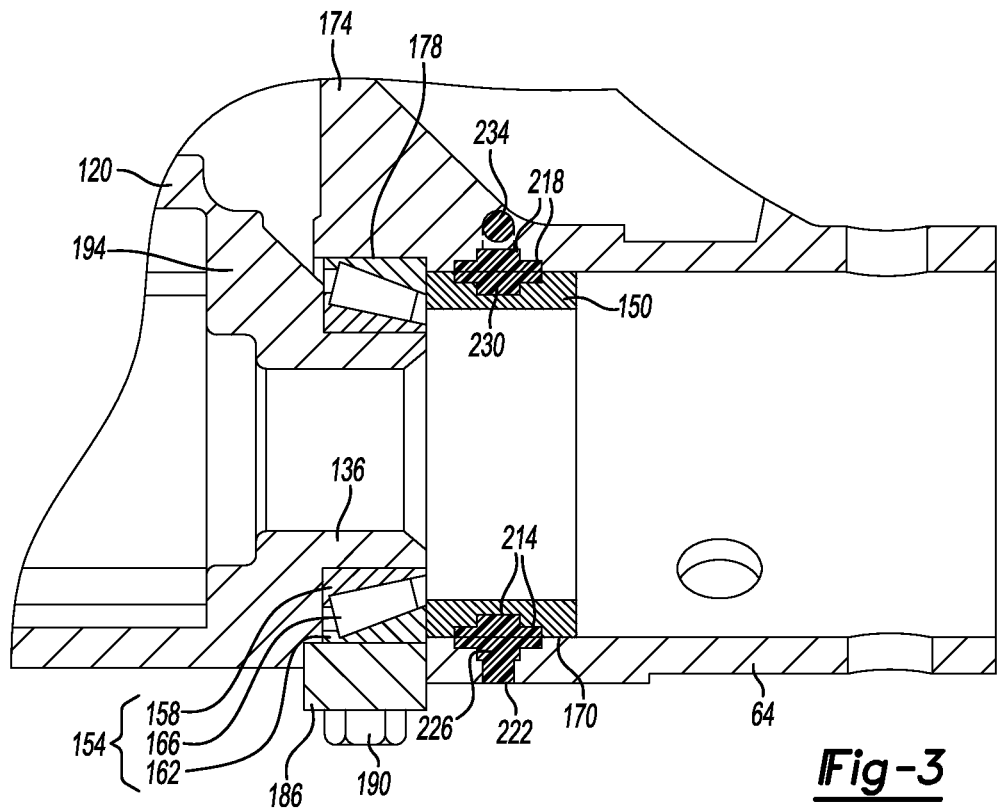
FIG. 3 is a sectional view of a portion of the axle assembly of FIG. 2 illustrating a portion of the axle assembly in more detail.

Referring to FIG. 3 the rear axle assembly 38 can further include a pair of bearing adjusters 150, and a pair of differential bearings 154, each of which having an inner bearing race 158, an outer bearing race 162, and a plurality of bearing elements 166 disposed between the inner and outer bearing races 158 and 162. The axle housing 64 can define a pair of adjuster bores 170 in which the bearing adjusters 150 can be positioned and a pair of bearing bulkheads 174.

Each bearing bulkhead 174 can define an aperture or bearing seat 178. The bearing seats 178 can define a rotational axis 182 (FIG. 2) around which the differential assembly 80 can be rotatably mounted. The adjuster bore 170 can be disposed on an outboard side of an associated one of the bearing seats 178. If desired, the bearing bulkheads 174 can be unitarily and integrally formed with and non-removably coupled to the wall member 84, but in the particular example provided, each bearing bulkhead 174 includes a bulkhead structure 174, which is unitarily and integrally formed with the wall member 84 and a bearing cap 186. A pair of threaded fasteners 190 is employed to fixedly but removably couple the bearing cap 186 to its associated bulkhead structure 174. The bearing cap 186 can be generally U-shaped in structure. On each end of the bearing cap 186 a fastener 190 can be located and extend through the cap 186 and into the bearing bulkhead 174. Tightening of the fastener 190 allows a compressive force to be generated thereby securing the cap 186 and the bulkhead 174 together.

Each of the inner bearing races 158 can be mounted on a corresponding one of the bearing hubs 136 and abutted against a shoulder 194 defined by the bearing hub 136 such that the differential bearings 154 are coupled to the differential case 120 to support the differential case 120 for rotation about the rotational axis 182 relative to the carrier housing 76.

Figure 4:
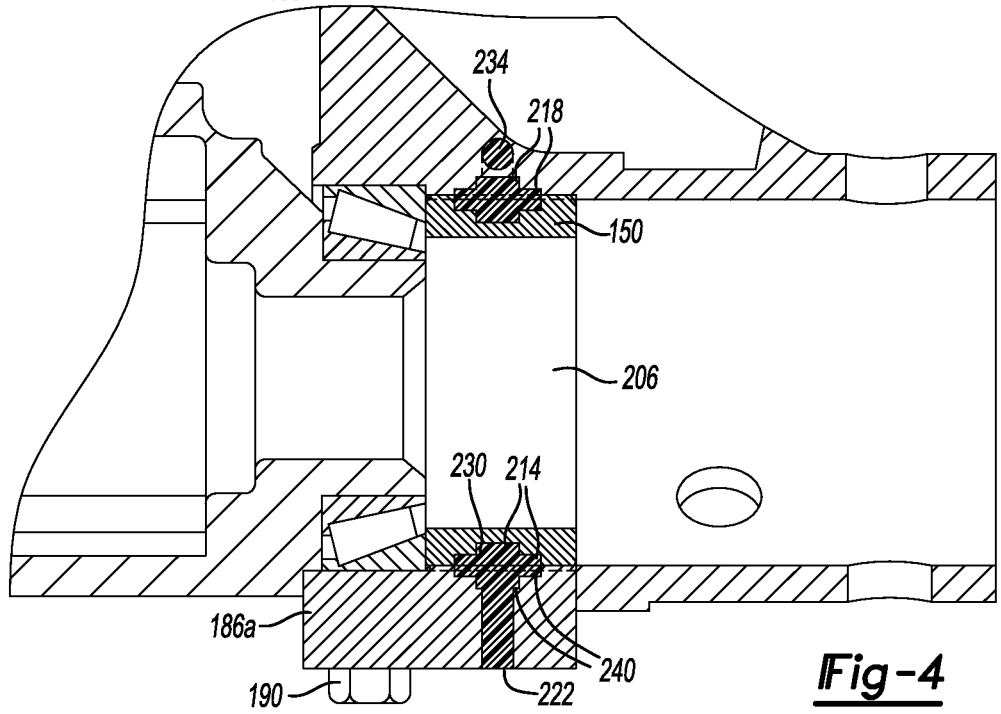
FIG. 4 is a view similar to that of FIG. 2, but depicting a portion of an alternately constructed axle assembly.

With reference to FIGS. 3, 4, and 6, the axle housing 64 bearing adjuster bores 170 can extend to the bulkhead 174 and allow an inboard end of the bearing adjuster 150 to make contact with the outer race 162 of the differential bearing 154. Each bearing adjuster 150 can include a body portion 198, an adjustment portion 202 and a longitudinally extending bore 206 that can be formed longitudinally through the bearing adjuster 150. The adjustment portion 202 of the bearing adjuster 150 can be threaded 202a to mate with an optional threaded section 210 on the axle housing 64 (FIG. 6). The bearing adjuster 150 adjustment portion 202 can also be smooth to allow a slip fit type connection with a threadless axle housing (FIG. 3). When positioned in the adjuster bore 170 the bearing adjuster 150 inboard end surface abuts against the outer bearing race 162. The bearing adjusters 150 can also partially enter the bearing bulkhead 174 to abut the differential bearing 154. When the inboard end surface of the bearing adjusters 150 abut the outer bearing races 162 a force can be applied through the bearing adjusters 150 to preload the differential bearings 154 into a preloaded condition. The preloaded condition of the differential bearings 154 can aid in setting the lash between the pinion 72 and the ring gear 124 and/or a desired gear tooth contact pattern. Each bearing adjuster 150 can contain a plurality of grooves 214 circumferentially spaced across its body 198 in both longitudinal and transverse patterns and directions. The bearing adjuster grooves 214 can also extend into the adjustment portion 202 of the bearing adjuster 150. The pattern of grooves 214 may be one of a circumferentially splined geometry or one of many other geometries. The inner surface of the axle housing 64 adjuster bore 170 may also contain a plurality of grooves 218 that are adjacent the bearing adjuster 150 and its grooves 214. The axle housing grooves 218 may mirror the bearing adjuster grooves 214 or be of a different design.

The axle housing 64 can include a sprue opening 222 to allow a flowing polymeric material 226 to be injected. The polymeric material 226 injected through the sprue opening 222 can enter between the adjuster bore 170 and the bearing adjuster 150 allowing it to flow into the axle housing grooves 218 and the bearing adjuster grooves 214. A period of time after entering the axle assembly 38, the polymeric material 226 solidifies forming a retaining member 230 that is at least partially disposed within the bearing adjuster grooves 214 and the axle housing grooves 218. The retaining member 230 thereafter non-rotatably and axially couples the bearing adjuster 150 in the adjuster bore 170 to the axle housing 64. The coupling of the bearing adjuster 150 to the axle housing 64 can thereby retain the differential bearing 154 in a preloaded direction along the bulkhead 174 rotational axis 182 when the differential bearing 154 is held in the preloaded position during injection and solidification of the polymeric material 226. The axle housing 64 can have a corresponding vent opening 234 to permit the escape of gasses during the injection of the polymeric material 226. The vent opening 234 can also permit visual inspection by an operator to determine the fill level of polymeric material 226 in the axle assembly 38. The polymeric material 226 can contain a glass component which acts as a reinforcing agent within the polymeric material 226.

With respect to FIGS. 4 and 6, the bearing cap 186a portion of the bearing bulkhead 174 can be designed to cover a segment of the bearing adjuster 150 rather than the axle housing 64. Thus the bearing cap 186a can aid in forming the adjuster bore 170. The bearing cap 186a can have a plurality of grooves 240 adjacent the body 198 of the bearing adjuster 202, the bearing adjuster grooves 214, and the adjuster bore grooves 218. The polymeric material 226, when entering the axle assembly 38, can flow into the adjustor bore 170, between the bearing cap 186a and the bearing adjuster 150 and then into the axle housing grooves 218, the bearing cap grooves 240, and the bearing adjuster grooves 214. Subsequent solidification and formation of the retaining member 230 can thereby couple and prevent relative rotational or axial movement between the axle housing 64 and the bearing adjuster 150. The bearing 154 can be placed in a preloaded condition prior to and during injection of the polymeric material 226 and formation of the retaining members 230. The lack of rotational or axial movement between the bearing adjuster 150 and the axle housing 64 caused by the retaining members 230 can thereby hold the differential bearing 154 in a preloaded condition.

With reference to FIG. 5, the adjuster bores 170 can be left vacant of a bearing adjuster 150 and the differential bearings 154 can be secured to the bulkhead 174 using only the polymeric material 226. The bearings 154a can have a plurality of bearing grooves 244 spaced along the outer surface of the outer bearing race 162a. The bearing bulkhead 174a and bearing cap 186a also can have a plurality of grooves 248 formed along the bearing seat 178a. The bearing grooves 244 and the bulkhead grooves 248 can be designed to accept the flowing polymeric material 266 when injected through the axle housing 64 sprue opening 222. When the polymeric material 226 solidifies in the bearing grooves 244 and bulkhead grooves 248, it forms a polymeric retaining member 230 that couples the bearing 154a to the bulkhead 174a and prevents relative rotation and axial movement between the components. The differential bearing 154a can be placed in a preloaded condition without the use of a bearing adjuster 150 prior to and during injection of the polymeric material 226. Upon solidification, the retaining members 230 can hold the differential bearings 154a in the preloaded condition without a bearing adjuster 150.

With reference to FIG. 6, the bearing adjuster 150 can contain a threaded adjuster portion 202a and can threadably engage with a threaded portion 210 of the axle housing 64. Rotation of the threaded bearing adjuster 150 through the threaded axle housing 64 adjuster bore 170 places an inboard end of the bearing adjuster 150 in abutting contact with the outer race 162 of the differential bearing 154. A force transmitted from the bearing adjuster 150 can thereby place the differential bearing 154 into a preloaded condition. After injection and solidification of the plastic material 226 the preloaded condition can be maintained by the retaining member 230 disposed through the bearing cap grooves 186a and the bearing adjuster grooves 214. The retaining member 230 thereby prevents relative rotational and axial movement between the bulkhead 174 and the bearing adjuster 150 preventing loosening of the bearing adjuster 150 from the threaded axle housing 64 adjuster bore 170.

From the foregoing, those of skill in the art will appreciate from this disclosure that the bearing bulkheads 174, the axle housing grooves 210, bearing bulkhead grooves 230, and the bearing adjuster grooves 214 cooperate to form a locking system for inhibiting relative rotation between the axle housing 64 and the bearing adjusters 150.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
   a housing defining a bearing bulkhead and an aperture, the aperture being disposed about a first axis;
   a pinion coupled to the housing for rotation about a second axis that is not coincident with the first axis;
   a differential case;
   a ring gear coupled to the differential case for rotation therewith, the ring gear being meshed with the pinion;
   a bearing that supports the case for rotation relative to the housing about the first axis;
   a bearing adjuster disposed within the aperture and abutting the bearing; and
   a retaining member formed of a polymeric material, the retaining member coupling the bearing adjuster to the bearing bulkhead such that the bearing adjuster is non-rotatably and axially fixed to the housing and a preload is applied to the bearing in a direction along the first axis.

2. The power transmitting component of claim 1, wherein the polymeric material further comprises glass reinforcing material.

3. The power transmitting component of claim 1, wherein the bearing preload creates a predetermined lash between the pinion and ring gear.

4. The power transmitting component of claim 1, wherein the aperture and the bearing adjuster are threaded, the bearing adjuster being threadably engaged to the aperture.

5. The power transmitting component of claim 1, wherein grooves are formed into the bearing adjuster and the aperture and wherein at least a portion of the retaining member is disposed in the grooves.

6. The power transmitting component of claim 1, wherein the bearing adjuster is slip fit into engagement with the aperture.

7. The power transmitting component of claim 1, wherein the housing defines a sprue opening for injection of the polymeric material.

8. The power transmitting component of claim 7, wherein the housing defines a vent opening.

9. A power transmitting component comprising:
   a housing defining a pair of bearing bulkheads, each of the bearing bulkheads having an aperture and a plurality of first grooves disposed about the aperture, the apertures being disposed about a first axis;
   a differential case received between the bearing bulkheads;
   a pair of bearings coupled to the case to support the differential case for rotation relative to the housing about the first axis;
   a pair of bearing adjusters, each of the bearing adjusters having an external surface with a plurality of second grooves and being received in an associated one of the apertures and abutting an associated one of the bearings; and
   a pair of retaining members, each of the retaining members being received in the first grooves in a corresponding one of the bearing bulkheads and the second grooves in a corresponding one of the bearing adjusters to axially and non-rotatably couple the bearing adjusters to the housing and secure the bearings in a preloaded condition along the first axis.

10. The power transmitting component of claim 9, wherein the bearings have an external surface, the external surface defining a third set of grooves in which the retaining members are received.

11. The power transmitting component of claim 9, wherein the retaining members are made of a polymeric material.

12. The power transmitting component of claim 11, wherein the polymeric material is reinforced with a glass material.

13. The power transmitting component of claim 11, wherein the housing defines a sprue opening to inject the polymeric material.

14. The power transmitting component of claim 13, wherein the housing defines a vent opening.

15. The power transmitting component of claim 9, wherein the housing defines a pair of apertures, the apertures and bearing adjusters are threaded, the bearing adjusters being threadably engaged to an associated one of the threaded apertures.

16. The power transmitting component of claim 9, wherein the housing defines a pair of apertures, the bearing adjusters are slip fit into engagement with an associated one of the apertures.

17. A method of assembling an axle assembly, the method comprising:
   (a) inserting an input pinion gear and a differential case into an axle housing, the differential case having a ring gear attached thereto;
   (b) inserting the differential case into an aperture defined by the axle housing, the aperture having a differential bearing received therein;
   (c) positioning the differential case relative to the input pinion to mesh the ring gear to the input pinion in a predetermined manner;
   (d) preloading the differential bearing;
   (e) while the differential bearing is preloaded, injecting a plastic material between the outer bearing race and the axle housing to form a pair of retaining members, each of the retaining members axially and non-rotatably coupling the outer bearing race of an associated one of the differential bearings to the axle housing.

18. The method of claim 17 further comprising, injecting the plastic material through a sprue and allowing gas to escape through a vent.

19. The method of claim 18 further comprising, visually inspecting the vent to determine plastic material fill level.

20. The method of claim 17 further comprising, preloading the differential bearing with force from a bearing adjuster.

* * * * *